United States Patent
Yang et al.

(10) Patent No.: US 7,291,005 B2
(45) Date of Patent: Nov. 6, 2007

(54) MOLD FOR MANUFACTURING HOUSING OF HYDRAULIC UNIT OF ANTI-LOCK BRAKE SYSTEM

(75) Inventors: I-Jin Yang, Pyungtak-Si (KR); Dong-Hun Ha, Pyungtak-Si (KR); Seong-Soo Kim, Pyungtak-Si (KR)

(73) Assignee: Mando Corporation, Gyeonggi-Do (KR)

( * ) Notice: Subject to any disclaimer, the term of this patent is extended or adjusted under 35 U.S.C. 154(b) by 354 days.

(21) Appl. No.: 10/977,730

(22) Filed: Oct. 29, 2004

(65) Prior Publication Data

US 2005/0106284 A1 May 19, 2005

(30) Foreign Application Priority Data

Nov. 14, 2003 (KR) .................. 10-2003-0080670
Nov. 14, 2003 (KR) .................. 10-2003-0080671
Nov. 14, 2003 (KR) .................. 10-2003-0080674

(51) Int. Cl.
*B29C 45/44* (2006.01)
(52) U.S. Cl. ............... 425/556; 264/318; 264/334; 425/441; 425/577; 425/DIG. 58
(58) Field of Classification Search ........ 425/330, 425/577, DIG. 58, 441, 556; 267/334, 318
See application file for complete search history.

(56) References Cited

U.S. PATENT DOCUMENTS

| 2,003,232 | A | * | 5/1935 | Benge ............... 264/318 |
| 5,403,179 | A | * | 4/1995 | Ramsey ............. 425/577 |
| 5,577,813 | A | | 11/1996 | Zaviska ............ 303/116.4 |
| 5,722,742 | A | | 3/1998 | Reinartz et al. ..... 303/119.2 |
| 6,079,961 | A | | 6/2000 | Schuller et al. ..... 417/549 |
| 6,355,201 | B1 | * | 3/2002 | McNary et al. ..... 264/318 |
| 2005/0153010 | A1 | * | 7/2005 | Sung ............... 425/330 |

* cited by examiner

Primary Examiner—Tim Heitbrink
(74) Attorney, Agent, or Firm—Ladas & Parry LLP

(57) ABSTRACT

Disclosed herein is a mold for manufacturing a housing of a hydraulic unit of an anti-lock brake system for vehicles. The housing has a plurality of bores formed therein such that components, such as a plurality of valves, accumulators, hydraulic pumps, and a driving motor, and a plurality of connection pipes are mounted to the housing through the bores. The mold comprises a lower mold mounted in a stationary frame for defining a housing forming space where the lower part and side parts of the housing are formed, an upper mold mounted in a movable frame disposed on the stationary frame such that the movable frame is vertically moved a predetermined distance, the upper mold covering the upper part of the housing forming space of the lower mold to form the upper part of the housing, lower cores attached to the lower mold such that the lower cores are protruded from the inner lower surface of the lower mold to form the lower-side bores of the housing, an upper core attached to the upper mold for forming the upper-side bores of the housing, and a plurality of side cores disposed at the lower mold such that the side cores move into and out of the housing forming space defined in the lower mold through the lower mold in four directions to form the bores provided at the four sides of the housing. With the mold according to the present invention, a housing having a complicated structure is manufactured through injection molding of a resin material. Consequently, the housing is easily manufactured with increased productivity as compared with the conventional method of manufacturing the housing through an aluminum cutting process. Furthermore, the manufacturing costs of the housing are reduced.

13 Claims, 10 Drawing Sheets

MOLD FOR MANUFACTURING HOUSING OF HYDRAULIC UNIT OF ANTI-LOCK BRAKE SYSTEM

CROSS-REFERENCE TO RELATED APPLICATION

This application claims the benefit of Korean Patent Application No. 2003-80670, No. 2003-80671, and No. 2003-80674, filed on Nov. 14, 2003 in the Korean Intellectual Property Office, the disclosure of which is incorporated herein by reference.

BACKGROUND OF THE INVENTION

1. Field of the Invention

The present invention relates to a mold for manufacturing a housing of a hydraulic unit of an anti-lock brake system for vehicles that allows manufacturing the housing through injection molding of a resin material.

2. Description of the Related Art

An anti-lock brake system mounted in a vehicle is a system that controls braking oil pressure applied to wheel cylinders of wheels of the vehicle such that the braking oil pressure is decreased or increased when the vehicle is braked. The wheel of the vehicle is not fully locked by means of the anti-lock brake system, whereby the vehicle is stopped within the shortest distance possible while the steering performance of the vehicle is maintained. Such an anti-lock brake system further comprises a hydraulic unit that controls braking oil pressure, an electronic control unit that controls the hydraulic unit, and wheel sensors that sense velocities of the respective wheels of the vehicle, in addition to a servomechanism, a master cylinder, and wheel cylinders of a common brake system for vehicles.

The hydraulic unit of the anti-lock brake system decreases, maintains, or increases braking oil pressures applied to the wheels of the vehicle to control the braking force. One example of the hydraulic unit of the anti-lock brake system is disclosed in U.S. Pat. No. 5,577,813 wherein the hydraulic unit of the anti-lock brake system comprises a block-type housing having a plurality of flow channels formed therein, a plurality of valves mounted to the housing for opening/closing the flow channels, a pump that pressurizes a fluid, and low-pressure and high-pressure accumulators that accumulate the fluid.

To manufacture the conventional hydraulic unit as described above, a metal material, such as aluminum, is cut to obtain a hexahedral housing, and then the housing is also cut to form a plurality of bores and a plurality of inner flow channels in the housing. In the block-type housing manufactured as described above are mounted a plurality of valves, a pump, and low-pressure and high-pressure accumulators. In this way, the hydraulic unit is manufactured.

In the conventional hydraulic unit of the anti-lock brake system, however, the aluminum housing is manufactured through a cutting step of cutting the housing such that the surface of the housing is flat, another cutting step of forming bores, in which a plurality of components are mounted in the housing, and yet another cutting step of forming inner flow channels in the housing. It is necessary that high-accuracy cutting operations be carried out at the respective cutting steps. As a result, the manufacturing process of the housing is very complicated and troublesome. Furthermore, the manufacturing costs of the housing are very high, since the housing is made of aluminum.

SUMMARY OF THE INVENTION

Therefore, it is an aspect of the invention to provide a mold for manufacturing a housing of a hydraulic unit of an anti-lock brake system for vehicles that allows manufacturing a housing through injection molding of a resin material such that the housing is easily manufactured, whereby production efficiency is improved, and thus the manufacturing costs of the housing are reduced.

In accordance with one aspect, the present invention provides a mold for manufacturing a housing of a hydraulic unit of an anti-lock brake system, the housing having a plurality of bores formed therein such that components, such as a plurality of valves, accumulators, hydraulic pumps, and a driving motor, and a plurality of connection pipes are mounted to the housing through the bores, wherein the mold comprises: a lower mold mounted in a stationary frame for defining a housing forming space where the lower part and side parts of the housing are formed; an upper mold mounted in a movable frame disposed on the stationary frame such that the movable frame is vertically moved a predetermined distance, the upper mold covering the upper part of the housing forming space of the lower mold to form the upper part of the housing; lower cores attached to the lower mold such that the lower cores are protruded from the inner lower surface of the lower mold to form the lower-side bores of the housing; an upper core attached to the upper mold for forming the upper-side bores of the housing; and a plurality of side cores disposed at the lower mold such that the side cores move into and out of the housing forming space defined in the lower mold through the lower mold in four directions to form the bores provided at the four sides of the housing.

Preferably, the lower mold comprises: a side forming member provided to form the side parts of the housing; and a lower forming member attached to the lower end of the side forming member for forming the lower part of the housing.

Preferably, the lower cores include a plurality of cores used to form bores disposed in the housing such that the plurality of valves are inserted in the bores.

Preferably, the side cores include cores used to form bores disposed in the housing such that the hydraulic pumps, the accumulators, and the plurality of connection pipes are inserted in the bores.

Preferably, the upper core includes a core used to form a bore disposed in the housing such that the driving motor is inserted in the bore.

Preferably, the upper core is provided with an injection channel for allowing molten resin to be injected into the housing forming space.

The mold further comprises: a plurality of hydraulic cylinder-type driving units that move the side cores into and out of the lower mold through the sides of the lower mold.

The mold further comprises: removing pins disposed at the lower mold such that such that the removing pins are moved upward into the housing forming space from the lower part of the lower mold to remove the housing from the housing forming space.

The mold further comprises: at least one flow channel forming core provided at the lower cores and the side cores for forming a flow channel in the housing.

Preferably, the side cores include cores used to form bores disposed in the housing such that the hydraulic pumps, the accumulators, and the plurality of connection pipes are inserted in the bores, and one of the cores used to form bores disposed in the housing such that the connection pipes are inserted in the bores is provided with the flow channel forming core, the flow channel forming core penetrating one of the lower cores.

Preferably, the flow channel forming core is connected to at least one of the side cores such that the flow channel forming core is moved inward and outward along with the corresponding side core, and the flow channel forming core penetrates another core when the mold is assembled.

Preferably, at least one of the cores is a rotary core having a thread part formed such that a corresponding thread part is formed at the inner surface of one of the bores by means of the thread part of the rotary core, the rotary core being rotated by means of a motor.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION OF THE PREFERRED EMBODIMENTS

Figure 1:
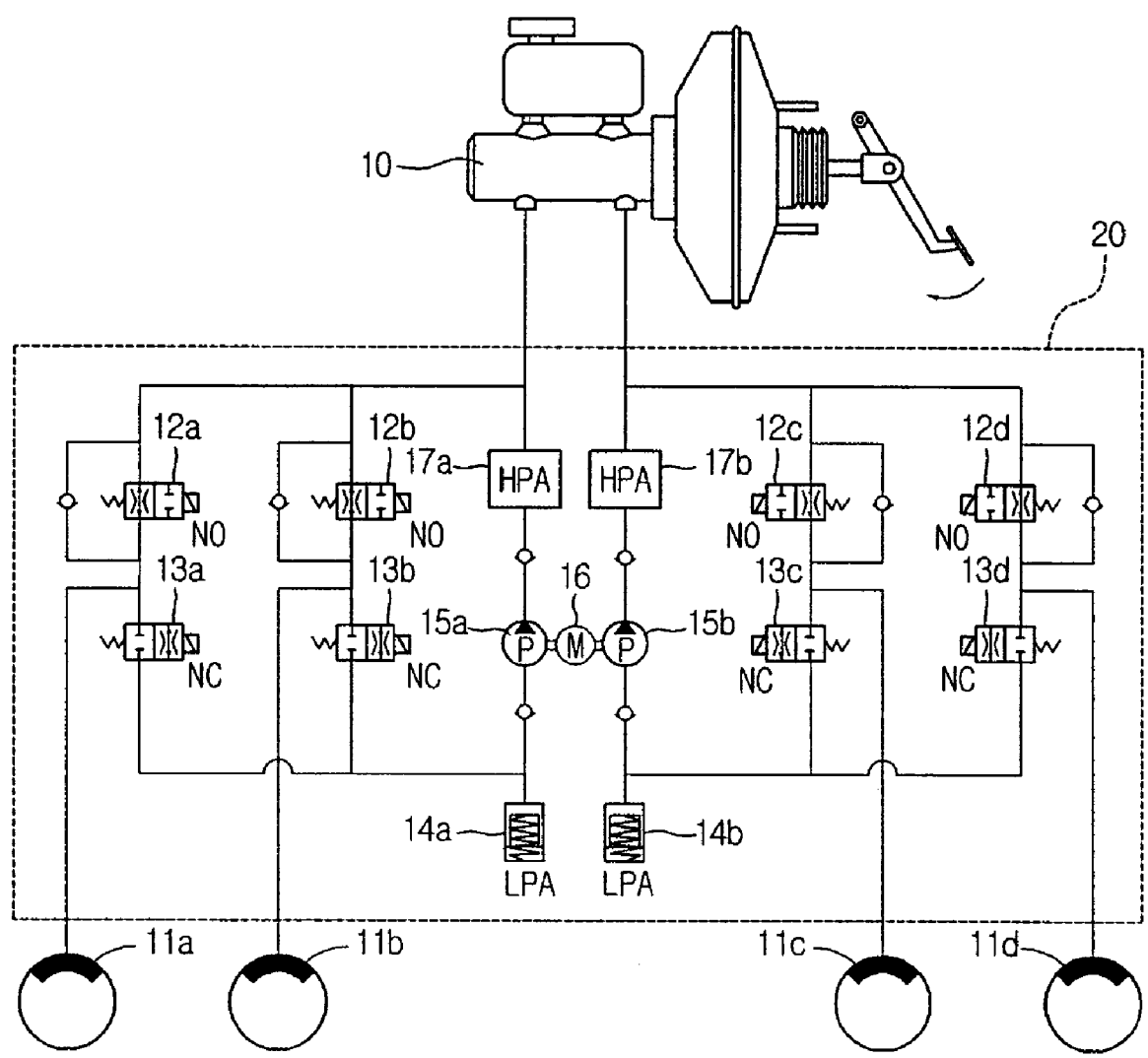
FIG. 1 is a view showing a hydraulic circuit of an anti-lock brake system, to which the present invention is applied.

Reference will now be made in detail to the embodiment of the present invention, examples of which are illustrated in the accompanying drawings, wherein like reference numerals refer to like elements throughout. The embodiment is described below to explain the present invention by referring to the figures.

FIG. 1 is a view showing a hydraulic circuit of an anti-lock brake system, to which the present invention is applied. As is shown in FIG. 1, the anti-lock brake system comprises: a plurality of valves 12a, 12b, 12c, 12d, 13a, 13b, 13c, and 13d that intermittently control transmission of braking oil pressure created in a master cylinder 10 to wheel cylinders 11a, 11b, 11c, and 11d mounted to front and rear wheels of the vehicle, respectively; and two low-pressure accumulators 14a and 14b that accumulate oil returned from the wheel cylinders 11a, 11b, 11c, and 11d. The anti-lock brake system further comprises: two hydraulic pumps 15a and 15b that pressurize oil accumulated in the low-pressure accumulators 14a and 14b; a driving motor 16 that operates the hydraulic pumps 15a and 15b; and two high-pressure accumulators 17a and 17b that accumulate oil discharged from the hydraulic pumps 15a and 15b to decrease pressure pulsation.

The plurality of valves in the hydraulic circuit of FIG. 1 comprise: normal open type valves 12a, 12b, 12c, and 12d, which are disposed upstream of flow channels connected to the wheel cylinders 11a, 11b, 11c, and 11d of the wheels, respectively; the normal open type valves 12a, 12b, 12c, and 12d being normally open; and normal closed type valves 13a, 13b, 13c, and 13d, which are disposed downstream of flow channels connected to the wheel cylinders 11a, 11b, 11c, and 11d of the wheels, respectively, the normal open type valves 12a, 12b, 12c, and 12d being normally open. The two hydraulic pumps 15a and 15b are common piston-type pumps, which are operated by means of the driving motor 16. The two low-pressure accumulators 14a and 14b are disposed at the flow channels at the inlet sides of the hydraulic pumps 15a and 15b for accumulating oil returned from the normal closed type valves 13a, 13b, 13c, and 13d and supplying the accumulated oil to the inlets of the hydraulic pumps 15a and 15b. The two high-pressure accumulators 17a and 17b are disposed at the flow channels at the outlet sides of the hydraulic pumps 15a and 15b for accumulating oil discharged from the hydraulic pumps 15a and 15b to decrease pressure pulsation caused by the operation of the hydraulic pumps 15a and 15b. The operation of the driving motor 16, that drives the valves 12a, 12b, 12c, 12d, 13a, 13b, 13c, and 13d, and the hydraulic pumps 15a and 15b, is controlled by means of an electronic control unit (not shown) such that the braking oil pressure transmitted to the wheel cylinders of the wheels are controlled.

Figure 2:
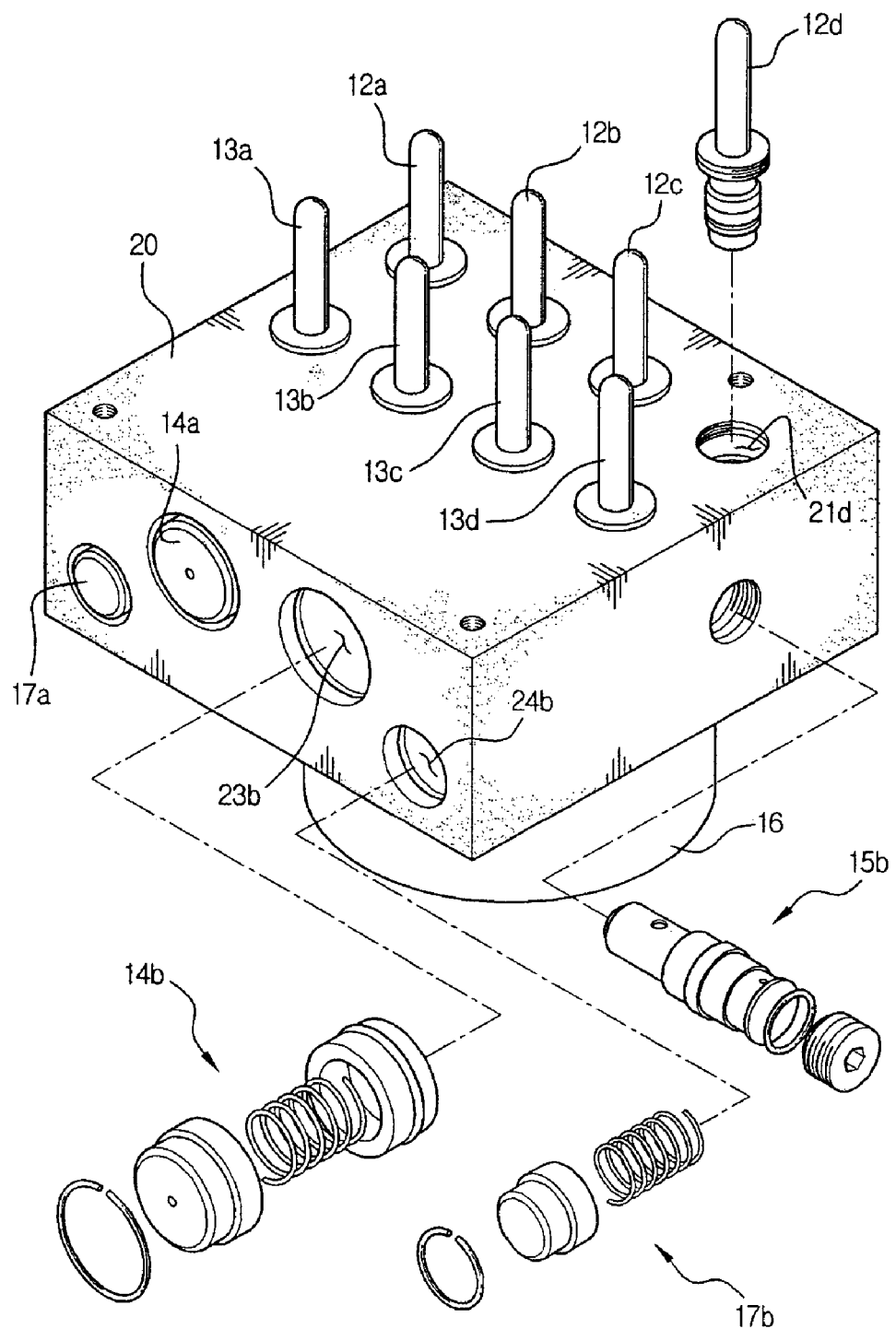
FIG. 2 is an exploded perspective view showing the structure of a hydraulic unit of the anti-lock brake system shown in FIG. 1.
Figure 3:
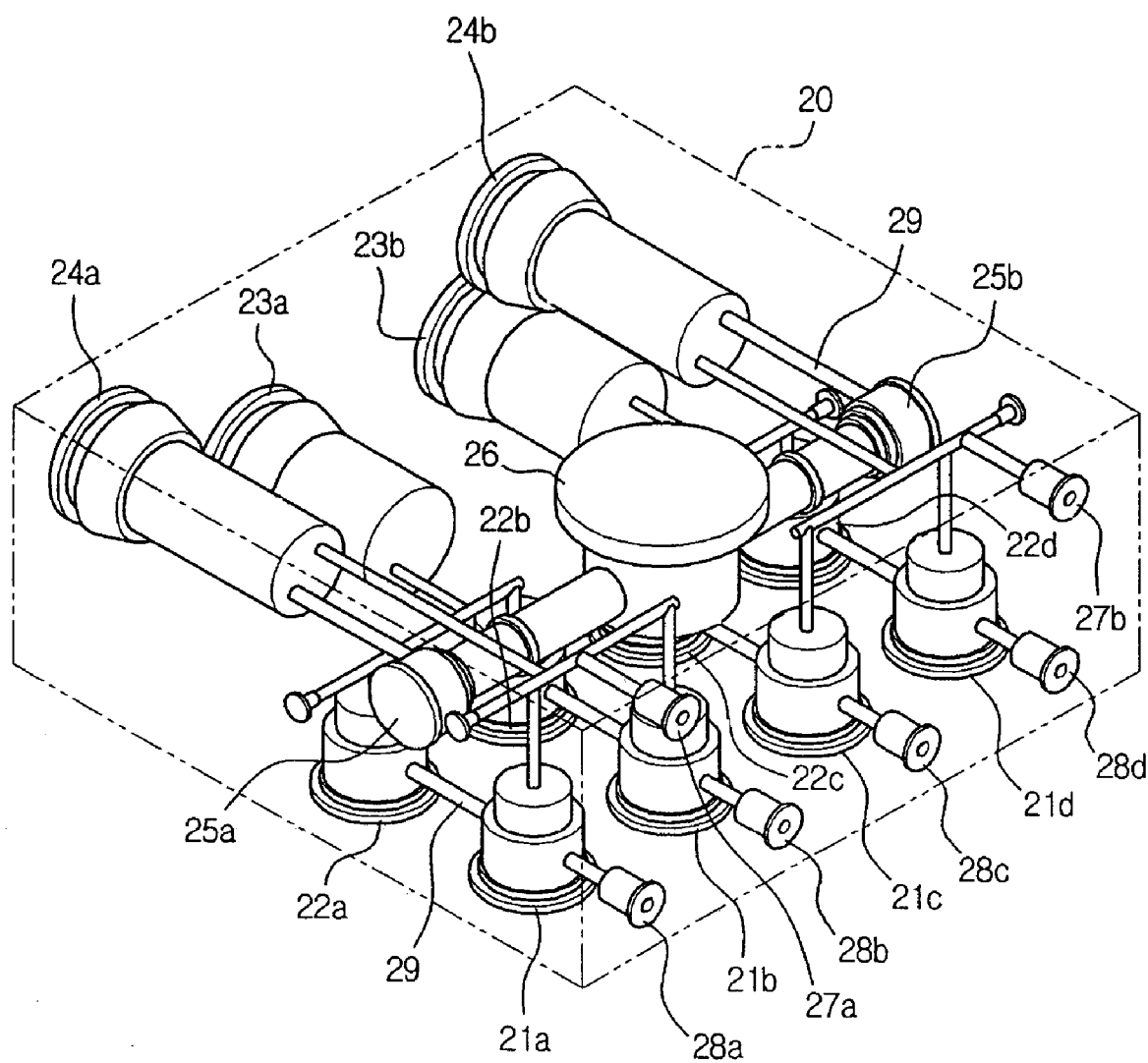
FIG. 3 is a perspective view showing bores and flow channels formed in a housing of the hydraulic unit of the anti-lock brake system shown in FIG. 2.

As is shown in FIG. 2, the plurality of valves 12a, 12b, 12c, 12d, 13a, 13b, 13c, and 13d, low-pressure and high-pressure accumulators 14a, 14b, 17a, and 17b, and hydraulic pumps 15a and 15b are mounted to a hexahedral housing 20 to form a hydraulic unit. To this end, the housing 20 of the hydraulic unit is provided with bores 21a, 21b, 21c, 21d, 22a, 22b, 22c, and 22d, in which the valves 12a, 12b, 12c, 12d, 13a, 13b, 13c, and 13d are fitted, respectively, bores 23a, 23b, 24a, and 24b, in which the low-pressure and high-pressure accumulators 14a, 14b, 17a, and 17b are fitted, respectively; bores 25a, 25b, and 26, in which the hydraulic pumps 15a and 15b, and the driving motor 16 that drives the hydraulic pumps 15a and 15b are fitted, respectively, and bores 27a, 27b, 28a, 28b, 28c, and 28d, in which a plurality of connection pipes are fitted, respectively, as is shown in FIG. 3. In the housing 20 is formed a plurality of flow channels 29 connected between the components mounted to the housing 20 and the connection pipes. In this way, the hydraulic unit as is shown in FIG. 1 is accomplished.

The housing 20 of the hydraulic unit according to the present invention is manufactured through injection molding of a resin material. Consequently, the housing 20 is easily manufactured. A mold 30 for manufacturing the housing 20 according to a first preferred embodiment of the present invention is shown in FIGS. 4 to 8.

Figure 4:
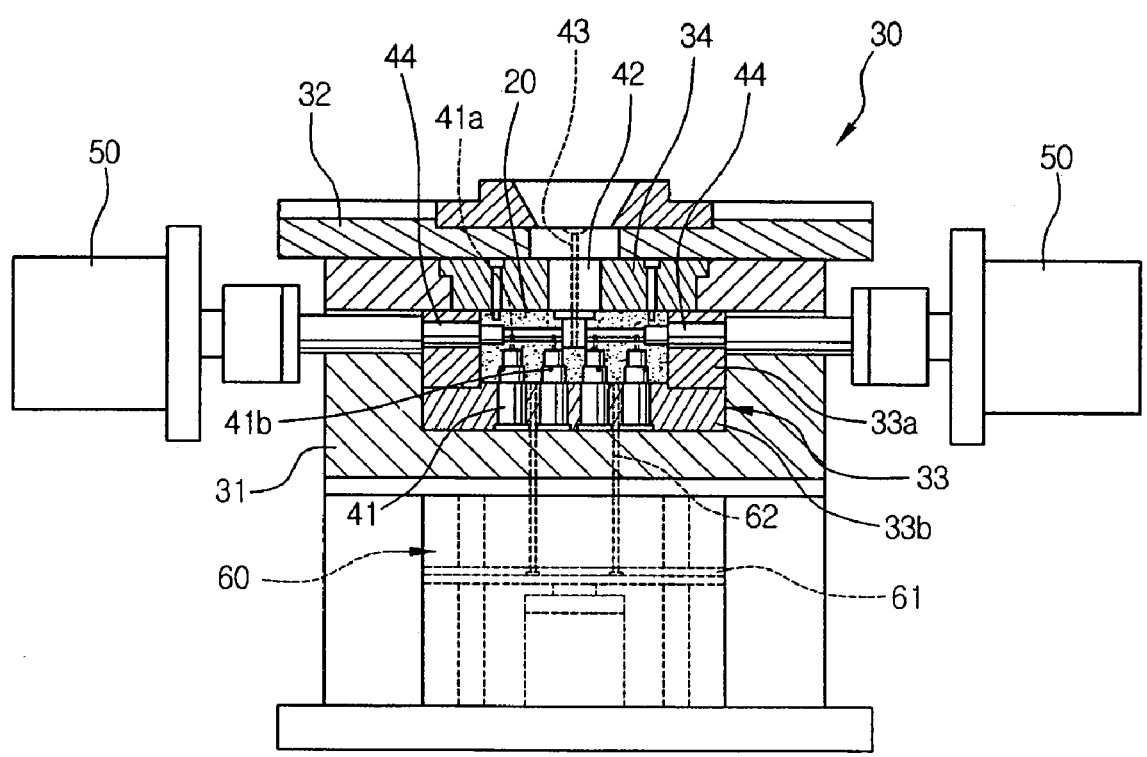
FIG. 4 is a longitudinal sectional view showing a mold for manufacturing a housing of a hydraulic unit of an anti-lock brake system according to a first preferred embodiment of the present invention.

As is shown in FIG. 4, the mold 30 comprises: a lower mold 33 mounted in a stationary frame 31 for defining a housing forming space; an upper mold 34 mounted in a movable frame 32 disposed on the stationary frame 31; a plurality of cores 41, 42, 44, 45, and 46 movable into the housing forming space for forming a plurality of bores in the housing 20; and a removing unit 60 that removes a molded product from the mold after the forming of the housing 20 is completed.

The lower mold 33 is fixedly attached to the center of the upper part of the stationary frame 31. The lower mold 33 is provided at the inner part thereof with a housing forming space, the upper part of which is open. Consequently, the lower part and side parts of the housing are formed in the housing forming space defined in the lower mold 33. The lower mold 33 comprises: a side forming member 33a having open upper and lower ends and a square forming space defined therein such that the side parts of the housing 20 can be formed in the side forming member 33a; and a lower forming member 33b attached to the lower end of the side forming member 33a for closing the lower end of the side forming member 33a. The upper mold 34 is attached to the lower surface of the movable frame 32, which moves a predetermined distance upward or downward to open or close the upper part of the housing forming space.

Figure 5:
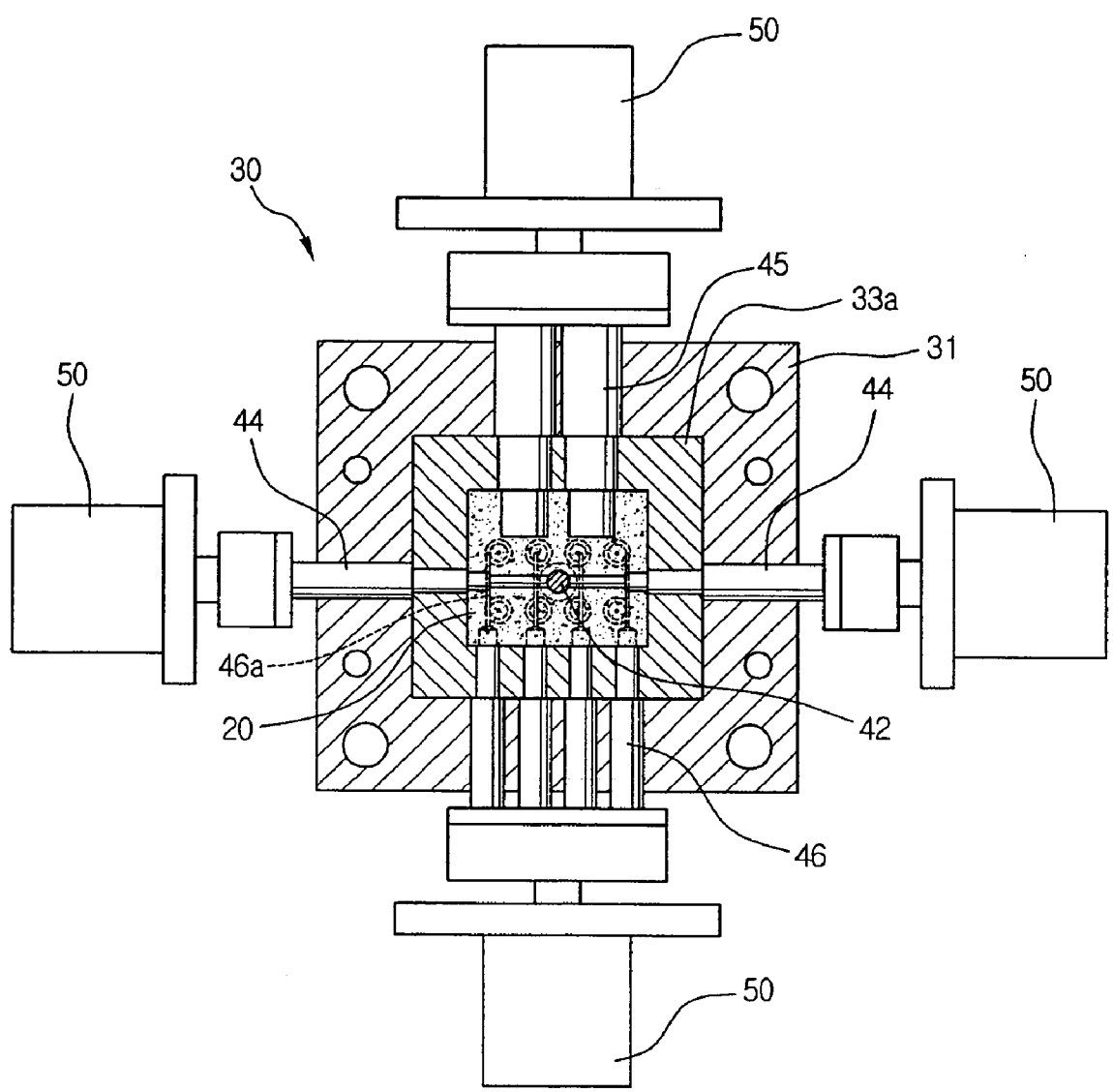
FIG. 5 is a cross-sectional view showing the housing-manufacturing mold according to the first preferred embodiment of the present invention shown in FIG. 4.

As is shown in FIGS. 4 and 5, the cores, which are used to form the plurality of bores, include a plurality of lower cores 41 attached to the lower forming member 33b of the lower mold 33, an upper core 42 attached to the upper mold 34, a plurality of side cores 44, 45, and 46 disposed such that the side cores 44, 45, and 46 move into and out of the housing forming space through the side forming member 33a of the lower mold 33 in four directions, and flow channel forming cores 41a and 46a formed at the lower cores 41 and the side cores 44, 45, and 46.

The lower cores 41 are used to form the bores 21a, 21b, 21c, 21d, 22a, 22b, 22c, and 22d, which are disposed in the housing 20 such that the plurality of valves 12a, 12b, 12c, 12d, 13a, 13b, 13c, and 13d are inserted in the bores 21a, 21b, 21c, 21d, 22a, 22b, 22c, and 22d. The lower cores 41 are attached to the lower forming member 33b such that the lower cores 41 are protruded into the housing forming space from the upper surface of the lower forming member 33b. The upper core 42 is used to form the bore 26, which is disposed in the housing 20 such that the driving motor 16 of the hydraulic unit is inserted in the bore 26. The upper core 42 is attached to the upper mold 34 such that the upper core 42 is protruded into the housing forming space from the lower surface of the upper mold 34. The upper core 42 is provided at the center thereof with an injection channel 43, which is formed through the upper core 42 in the longitudinal direction thereof for allowing molten resin to be injected into the housing forming space therethrough while the upper mold 34 and the lower mold 33 are assembled.

As is shown in FIG. 5, the plurality of side cores 44, 45, and 46 include the cores 44 used to form the bores 25a and 25b, in which the hydraulic pumps 15a and 15b are inserted, respectively, the cores 45 used to form the bores 23a, 23b, 24a, and 24b, in which the accumulators 14a, 14b, 17a, and 17b are inserted, respectively, and the cores 46 used to form the bores 27a, 27b, 28a, 28b, 28c, and 28d, in which the plurality of connection pipes are inserted. The side cores 44, 45, and 46 are disposed such that the side cores 44, 45, and 46 move into and out of the housing forming space through the side forming member 33a of the lower mold 33 and the stationary frame 31. The side cores 44, 45, and 46 are connected, at the outside of the stationary frame 31, to hydraulic cylinder-type driving units 50, by which the side cores 44, 45, and 46 are moved inward and outward, respectively. As the hydraulic cylinder-type driving units 50 are operated, the side cores 44, 45, and 46 are moved inward and outward. In this way, the side cores are moved into or out of the housing forming space.

Figure 6:
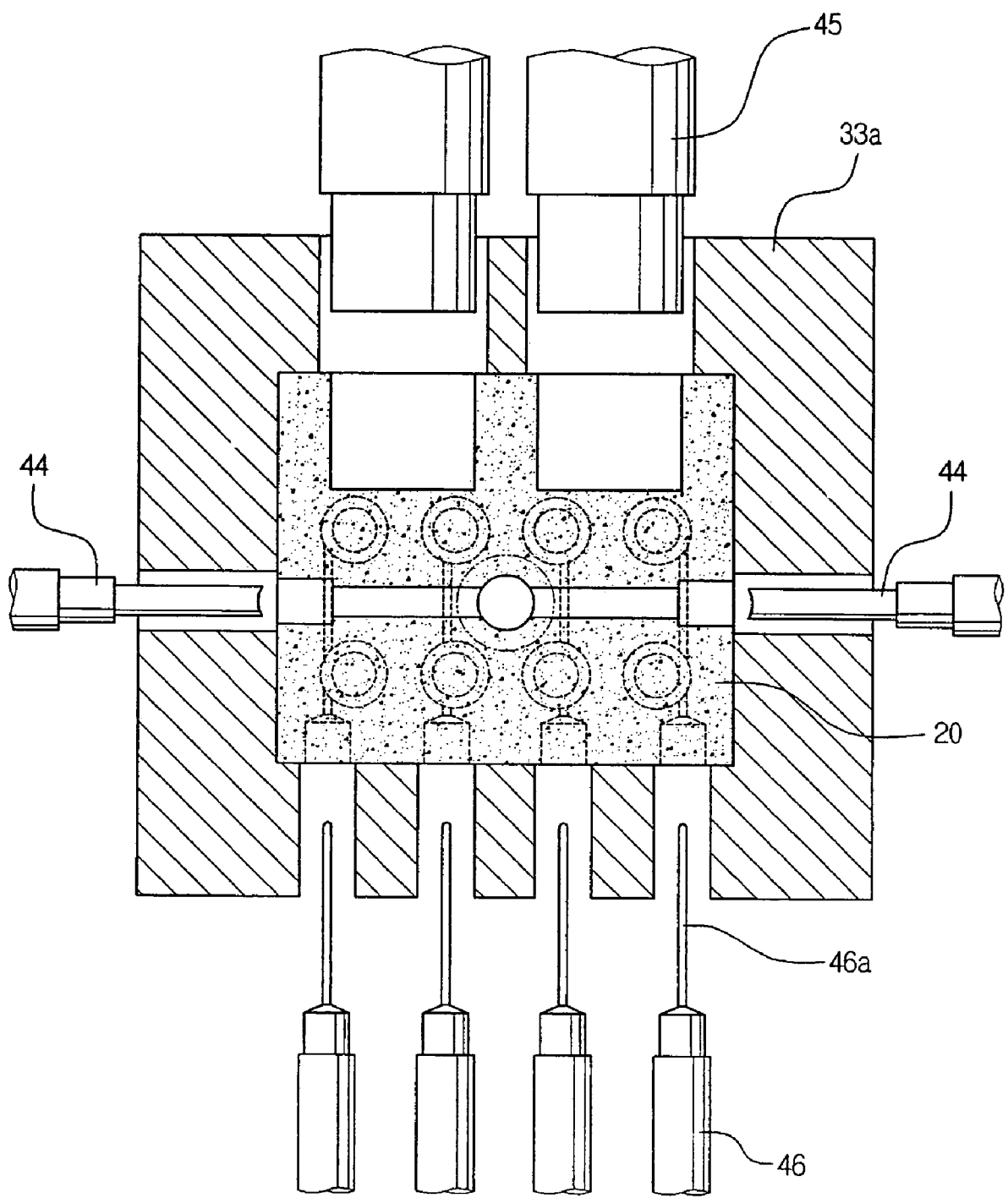
FIG. 6 is a cross-sectional view showing the housing-manufacturing mold according to the first preferred embodiment of the present invention shown in FIG. 4, illustrating side cores separated from the mold.
Figure 7:
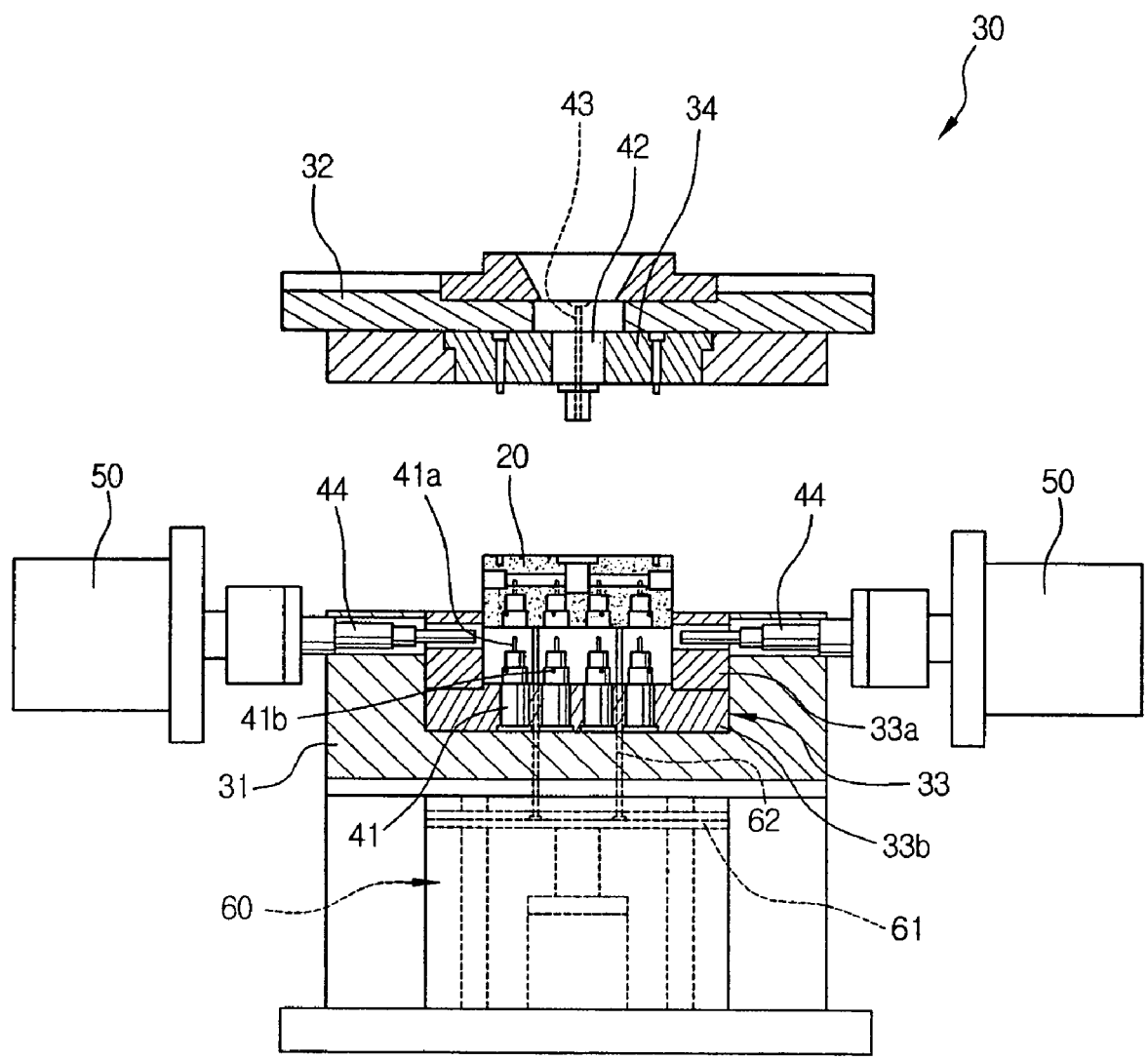
FIG. 7 is a longitudinal sectional view showing the housing-manufacturing mold according to the first preferred embodiment of the present invention shown in FIG. 4, illustrating removal of a molded product.
Figure 8:
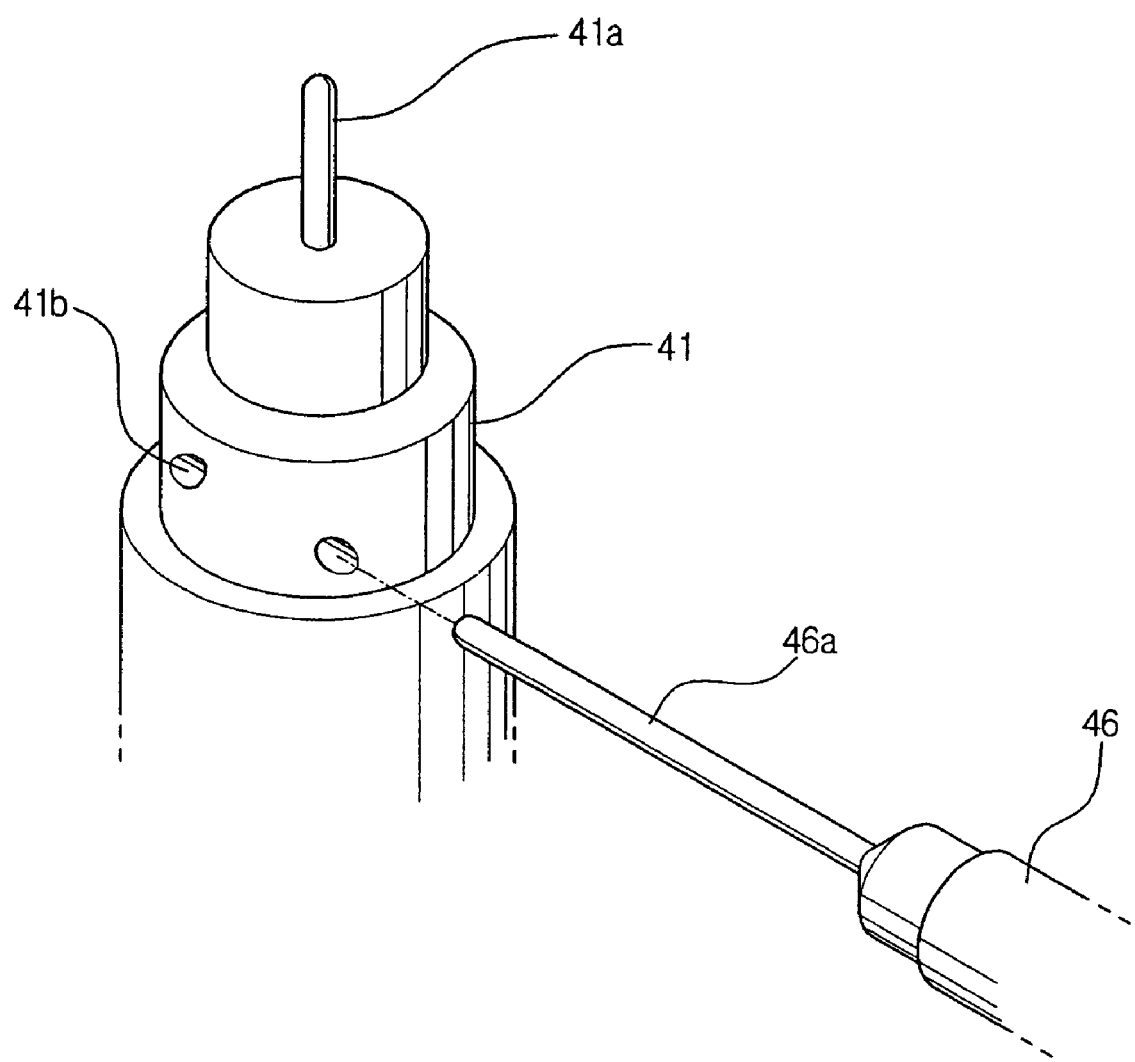
FIG. 8 is a perspective view showing a flow channel-forming core of the housing-manufacturing mold according to the first preferred embodiment of the present invention shown in FIG. 4.

As is shown in FIGS. 6 and 7, the flow channel forming cores 41a and 46a used to form the flow channels in the housing 20 include the cores 41a vertically extending a predetermined length from the upper ends of the lower cores 41, respectively, and the cores 46a horizontally extending a predetermined length from the ends of the side cores 46, respectively. The cores 41a are formed in the shape of a pin. Similarly, the cores 46a are formed in the shape of a pin. The cores 46a extending from the side cores 46 penetrate the lower cores 41 through through-holes 41b formed at the lower cores 41, as is shown in FIG. 8. Consequently; the flow channels are formed in the housing 20 by means of the flow channel forming cores 41a and 46a when the mold is assembled. Also, the flow channel forming cores 46a extending from the side cores 46 penetrate the lower cores 41. Consequently, the bores formed by means of the lower cores 41 and the bores formed by means of the side cores 46 are connected to each other by means of the flow channels formed by means of the flow channel forming cores 46a. In this embodiment, the flow channel forming cores 41a are provided at the lower cores 41, and the flow channel forming cores 46a are provided at the side cores 46 in order to form the flow channels together with the plurality of bores in the course of forming the housing. However, the housing 20 may be formed without using the flow channel forming cores 41a and 46a, and then the flow channels may be formed in the housing 20 through a cutting process.

After the housing forming process is completed, the molded product is removed from the mold 30 by means of the removing unit 60. As is shown in FIGS. 4 and 7, the removing unit comprises: a removing plate 61 disposed below the stationary frame 31 such that the removing plate 61 can be vertically moved a predetermined distance; and a plurality of removing pins 62 fixed to the removing plate 61 such that the removing pins 62 are vertically moved through the lower parts of the lower mold 33 and the stationary frame 31, and thus the removing pins 62 are moved into and out of the housing forming space. When the removing plate 61 is moved upward, the removing pins 62 are also moved upward through the housing forming space, whereby the molded product is removed from the mold.

Now, a method of forming the housing using the mold will be described.

When the upper mold 32 is disposed on the lower mold, the housing forming space is provided in the mold, as is shown in FIG. 4. The plurality of side cores 44, 45, and 46 are moved into the housing forming space of the mold 30 to form the plurality of bores in the housing 20. At this time, the flow channel forming cores 46a provided at the side cores 46 penetrate the lower cores 41.

Molten resin is injected into the housing forming space of the mold 30 through the injection channel 43 provided at the upper core 42 of the upper mold 34. The resin injected in the housing forming space is solidified to manufacture the housing 20.

The manufactured housing 20 is removed from the mold 30 as follows. As is shown in FIG. 6, the plurality of side cores 44, 45, and 46 are separated from the housing forming space of the mold 30 so that the housing 20 can be moved upward from the housing forming space of the mold 30. At this time, the flow channel forming cores 46a are also separated from the housing forming space of the mold 30. Subsequently, the upper mold 34 is moved upward such that the upper mold 34 is separated from the lower mold 33, as is shown in FIG. 7. Finally, the removing pins 62 are moved upward by means of the removing plate 61 of the removing unit 60 as the removing plate 61 is moved upward. Consequently, the removing pins 62 are moved into the house forming space of the mold 30, and thus the housing 20 is moved upward by means of the removing pins 62. In this way, the housing 20 is removed from the mold 30.

Figure 9:
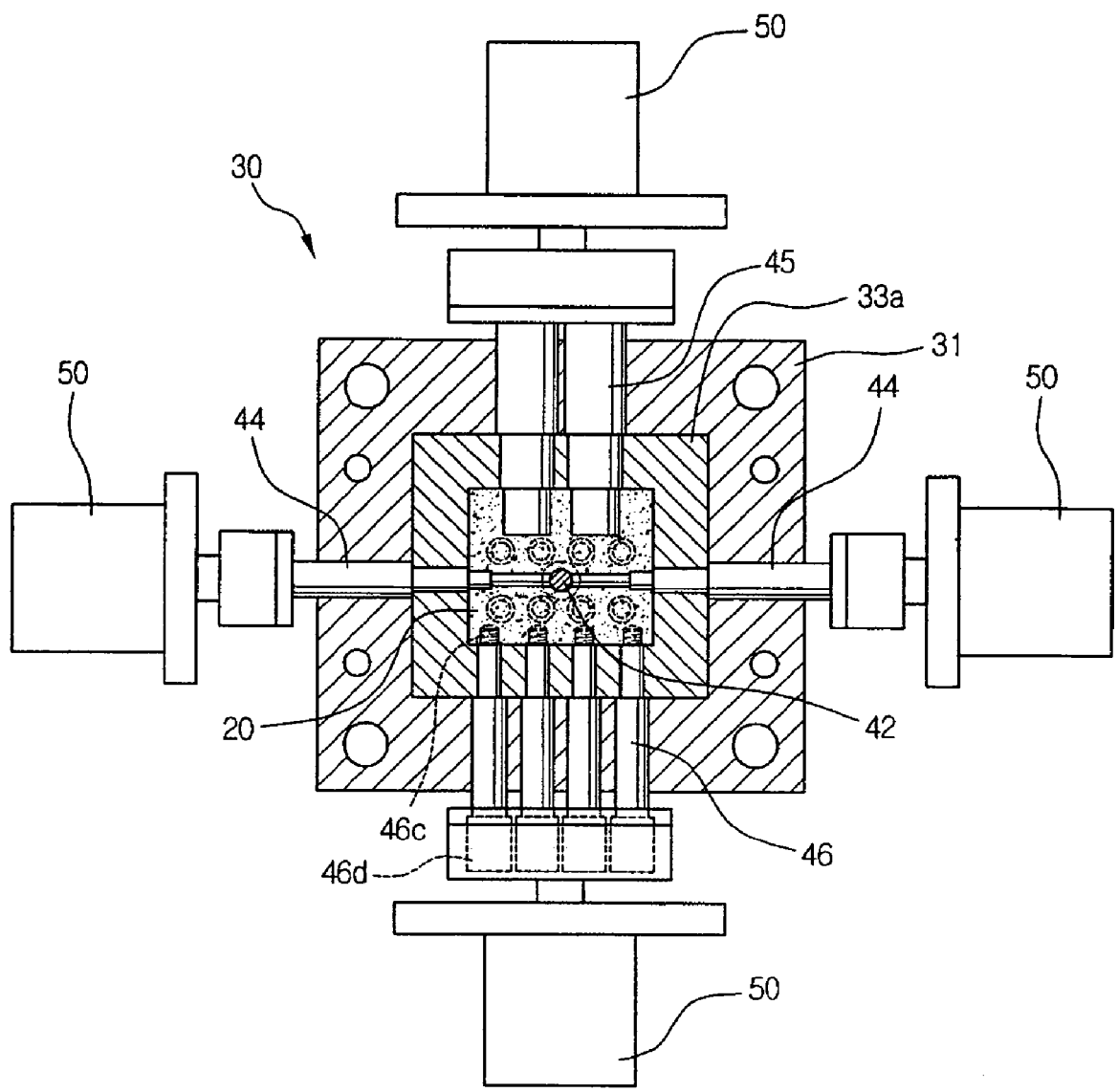
FIG. 9 is a cross-sectional view showing a mold for manufacturing a housing of a hydraulic unit of an anti-lock brake system according to a second preferred embodiment of the present invention.
Figure 10:
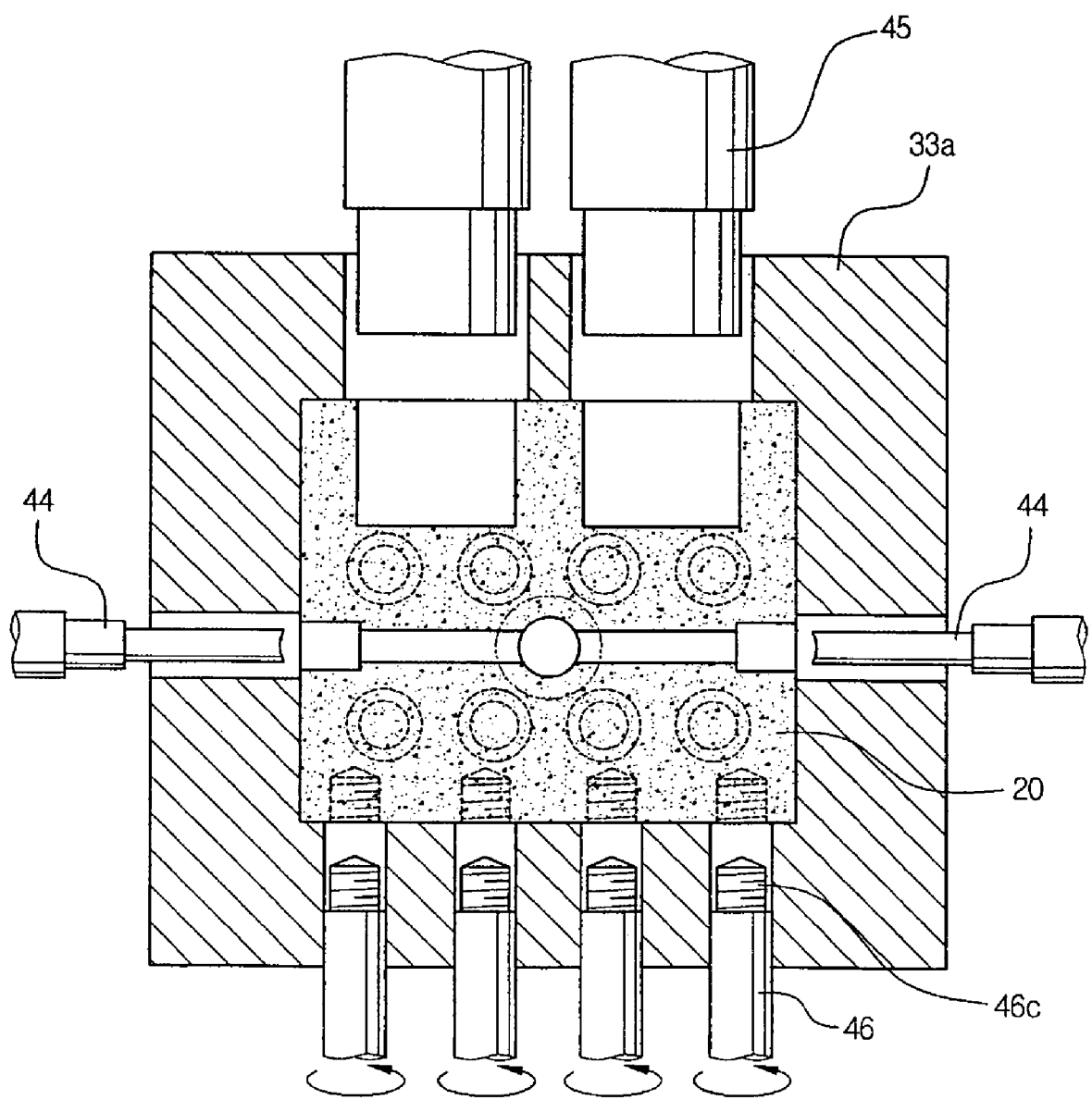
FIG. 10 is a cross-sectional view showing the housing-manufacturing mold according to the second preferred embodiment of the present invention shown in FIG. 9, illustrating side cores separated from the mold.

FIGS. 9 and 10 show a mold for manufacturing the housing 20 according to a second preferred embodiment of the present invention. This embodiment is different from the previously described first embodiment of the present invention in that the side cores 46 used to form the connection pipe insertion bores are rotary cores having thread parts 46 provided at their ends, respectively. The cores 46 are rotated by means of motors 46d provided at the hydraulic cylinder-type driving units 50. Consequently, corresponding thread parts are formed at the inner surfaces of the bores by means of the thread parts 46c provided at the ends of the cores 46. When the molded product is to be removed from the mold, the cores 46 are easily separated from the molded product as the cores 46 are rotated, in the directions where the cores 46 are separated from the molded product, by means of the motors 46d. In this embodiment, some of the side cores, i.e., the side cores 46 used to form the connection pipe insertion bores are modified such that the side cores 46 are rotated, although not only the other side cores but also the upper and lower cores may also be modified such that the cores are rotated.

As apparent from the above description, the present invention provides a mold for manufacturing a housing of a hydraulic unit of an anti-lock brake system for vehicles that allows manufacturing a housing having a complicated structure through injection molding. Consequently, the present invention has the effect that the housing is easily manufactured with increased productivity as compared with the conventional method of manufacturing the housing through an aluminum cutting process. In addition, the manufacturing costs of the housing are reduced.

According to the present invention, flow channels are formed in the housing together with a plurality of bores in the course of forming the housing. Consequently, the housing manufacturing process is simplified.

Also, thread parts are formed at the inner surfaces of the bores by means of rotary cores having corresponding thread parts in the course of forming the housing. Consequently, the housing manufacturing process is simplified.

Although embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A mold for manufacturing a housing of a hydraulic unit of an anti-lock brake system, the housing having a plurality of bores formed therein wherein the mold comprises:

a lower mold mounted in a first frame for defining a housing forming space where a lower part and side parts of the housing are formed;

an upper mold mounted in a movable frame disposed adjacent the first frame such that when the movable frame is vertically moved a predetermined distance, the upper mold covers an upper part of the housing forming space of the lower mold to define an upper part of the housing therewith;

lower cores attached to the lower mold such that the lower cores protrude from an inner lower surface of the lower mold to form lower-side bores of the housing;

an upper core attached to the upper mold for forming at least one upper-side bore of the housing; and a plurality of side cores disposed transverse to the upper and lower cores at the lower mold such that the side cores move into and out of the housing forming space defined in the lower mold through the lower mold in four directions to form the bores provided at four sides of the housing.

2. The mold according to claim 1, wherein the lower mold comprises: a side forming member provided to form the side parts of the housing; and a lower forming member attached to the lower end of the side, forming member for forming the lower part of the housing.

3. The mold according to claim 1, wherein the lower cores include a plurality of cores used to form bores disposed in the housing such that the plurality of valves are inserted in the bores.

4. The mold according to claim 1, wherein the side cores include cores used to form bores disposed in the housing such that the hydraulic pumps, the accumulators, and the plurality of connection pipes are inserted in the bores.

5. The mold according to claim 1, wherein the upper core includes a core used to form a bore disposed in the housing such that the driving motor is inserted in the bore.

6. The mold according to claim 5, wherein the upper core is provided with an injection channel for allowing molten resin to be injected into the housing forming space.

7. The mold according to claim 1, further comprising: a plurality of hydraulic driving units that move the side cores into and out of the lower mold through the sides of the lower mold.

8. The mold according to claim 1, further comprising: removing pins disposed at the lower mold such that such that the removing pins are moved upward into the housing forming space from the lower part of the lower mold to remove the housing from the housing forming space.

9. The mold according to claim 1, further comprising: at least one flow channel forming core provided at the lower cores and the side cores for forming a flow channel in the housing.

10. The mold according to claim 9, wherein the side cores include cores used to form bores disposed in the housing such that the hydraulic pumps, the accumulators, and the plurality of connection pipes are insertable in the bores, and wherein one of the cores used to form bores disposed in the housing such that the connection pipes are inserted in the bores is provided with the flow channel forming core, the flow channel forming core penetrating one of the lower cores.

11. The mold according to claim 9, wherein the flow channel forming core is connected to at least one of the side cores such that the flow channel forming core is moved inward and outward along with the corresponding side core, and the flow channel forming core penetrates another core when the mold is assembled.

12. The mold according to claim 1, wherein at least one of the cores is a rotary core having a thread part formed such that a corresponding thread part is formed at the inner surface of one of the bores by means of the thread part of the rotary core, the rotary core being rotated by means of a motor.

13. A mold for manufacturing a housing of a hydraulic unit of an anti-lock brake system, the housing having a plurality of bores formed therein such that a plurality of valves, accumulators, hydraulic pumps, so a driving motor, and a plurality of connection pipes can be mounted to the housing through the bores, wherein the mold comprises:

a lower mold mounted in a stationary frame for defining a housing forming space where the lower part and side parts of the housing are formed;

an upper mold mounted in a movable frame disposed on the stationary frame such that the movable frame is vertically moved a predetermined distance, the upper mold covering the upper part of the housing forming space of the lower mold to form the upper part of the housing;

lower cores attached to the lower mold such that the lower cores are protruded from the inner lower surface of the lower mold to form the lower-side bores of the housing;

an upper core attached to the upper mold for forming the upper-side bores of the housing; and a plurality of side cores transverse to the upper and lower cores disposed at the lower mold such that the side cores move into and out of the housing forming space defined in the lower mold through the lower mold in four directions to form the bores provided at the four sides of the housing.

* * * * *